(12) United States Patent
Vitt et al.

(10) Patent No.: US 12,071,889 B2
(45) Date of Patent: Aug. 27, 2024

(54) COUNTER-ROTATING TURBINE

(71) Applicants: General Electric Company, Schenectady, NY (US); General Electric Deutschland Holding GmbH, Frankfurt (DE); GE Avio Srl, Rivalta di Torino (IT)

(72) Inventors: Paul Hadley Vitt, Liberty Township, OH (US); Lyle Douglas Dailey, Cincinnati, OH (US); Matteo Renato Usseglio, Turin (IT); Andreas Peters, Munich (DE); Jonathan Ong, Garching (DE)

(73) Assignees: General Electric Company, Cincinnati, OH (US); General Electric Deutschland Holding GmbH, Frankfurt (DE); GE Avio Srl, Rivalta di Torino (IT)

( * ) Notice: Subject to any disclaimer, the term of this patent is extended or adjusted under 35 U.S.C. 154(b) by 0 days.

(21) Appl. No.: 17/713,649

(22) Filed: Apr. 5, 2022

(65) Prior Publication Data

US 2023/0340906 A1 Oct. 26, 2023

(51) Int. Cl.
| | |
|---|---|
| *F02C 3/06* | (2006.01) |
| *F02C 3/067* | (2006.01) |
| *F02C 7/14* | (2006.01) |
| *F02C 7/141* | (2006.01) |
| *F02C 7/36* | (2006.01) |

(52) U.S. Cl.
CPC ............. *F02C 3/067* (2013.01); *F02C 7/141* (2013.01); *F02C 7/36* (2013.01); *F05D 2220/60* (2013.01); *F05D 2260/213* (2013.01); *F05D 2260/40311* (2013.01)

(58) Field of Classification Search
CPC .. F02C 3/067; F02C 3/04; F02C 3/113; F02C 7/36; F02C 7/141; F05D 2220/60; F05D 2260/213; F05D 2260/40311; F02K 3/072; F02K 3/04
See application file for complete search history.

(56) References Cited

U.S. PATENT DOCUMENTS

| | | | |
|---|---|---|---|
| 3,135,496 A | 6/1964 | Scheper, Jr. | |
| 4,502,837 A | 3/1985 | Blair et al. | |
| 4,981,414 A | 1/1991 | Sheets | |
| 5,010,729 A * | 4/1991 | Adamson | F02C 3/067 416/129 |
| 5,152,661 A | 10/1992 | Sheets | |
| 5,209,644 A | 5/1993 | Dorman | |

(Continued)

FOREIGN PATENT DOCUMENTS

EP 3124794 A1 2/2017

OTHER PUBLICATIONS

Gas Turbine Performance by Philip Walsh and Paul Fletcher (Year: 1998).*

*Primary Examiner* — Dapinder Singh
(74) *Attorney, Agent, or Firm* — Dority & Manning, P.A.

(57) ABSTRACT

A turbine section and an exhaust section for a gas turbine engine includes a low pressure (LP) turbine having first stage LP turbine blades that rotate in a first direction at a first speed, and final stage LP turbine blades downstream of the first stage LP turbine blades that rotate in a second direction opposite the first direction at a second speed. The second speed is lower than the first speed.

19 Claims, 3 Drawing Sheets

(56) References Cited

U.S. PATENT DOCUMENTS

| | | | |
|---|---|---|---|
| 5,352,092 A | 10/1994 | Ferleger et al. | |
| 5,616,004 A | 4/1997 | Alizadeh | |
| 5,779,443 A | 7/1998 | Haller et al. | |
| 6,375,419 B1 | 4/2002 | LeJambre et al. | |
| 6,488,470 B1* | 12/2002 | Owczarek | F01D 1/02 |
| | | | 415/207 |
| 6,709,239 B2 | 3/2004 | Chandraker | |
| 6,711,887 B2 | 3/2004 | Orlando et al. | |
| 6,799,948 B2 | 10/2004 | Ito et al. | |
| 6,802,474 B2 | 10/2004 | Sonoda et al. | |
| 7,175,393 B2 | 2/2007 | Chandraker | |
| 7,179,058 B2 | 2/2007 | Chandraker | |
| 7,204,676 B2 | 4/2007 | Dutton et al. | |
| 7,246,484 B2* | 7/2007 | Giffin, III | F02K 3/077 |
| | | | 60/226.3 |
| 7,374,403 B2 | 5/2008 | Decker et al. | |
| 7,416,382 B2 | 8/2008 | Guemmer | |
| 7,419,353 B2 | 9/2008 | Guemmer | |
| 7,451,592 B2 | 11/2008 | Taylor et al. | |
| 7,967,571 B2 | 6/2011 | Wood et al. | |
| 8,157,518 B2 | 4/2012 | Decker et al. | |
| 8,166,748 B2* | 5/2012 | Schilling | F01D 1/26 |
| | | | 60/268 |
| 8,292,570 B2 | 10/2012 | Suciu et al. | |
| 8,292,574 B2 | 10/2012 | Wood et al. | |
| 8,337,154 B2 | 12/2012 | Decker et al. | |
| 8,439,646 B2 | 5/2013 | Guemmer | |
| 8,468,826 B2 | 6/2013 | Kares et al. | |
| 8,517,677 B2 | 8/2013 | Wood et al. | |
| 8,573,946 B2 | 11/2013 | Power et al. | |
| 8,678,757 B2 | 3/2014 | Li | |
| 8,864,457 B2 | 10/2014 | Malandra et al. | |
| 9,046,111 B2 | 6/2015 | Harvey et al. | |
| 9,080,512 B2 | 7/2015 | Suciu et al. | |
| 9,200,518 B2 | 12/2015 | Kares | |
| 9,777,578 B2 | 10/2017 | Yokoyama et al. | |
| 9,790,796 B2 | 10/2017 | Stampfli et al. | |
| 9,797,267 B2 | 10/2017 | Lohaus et al. | |
| 9,945,266 B2 | 4/2018 | Ekanayake et al. | |
| 10,233,761 B2 | 3/2019 | Snider et al. | |
| 10,577,956 B2 | 3/2020 | Northall et al. | |
| 10,697,471 B2 | 6/2020 | Northall et al. | |
| 10,830,130 B2* | 11/2020 | Suciu | F02C 3/107 |
| 11,015,449 B2 | 5/2021 | Koda et al. | |
| 11,149,549 B2 | 10/2021 | Koda | |
| 2005/0241292 A1* | 11/2005 | Taylor | F02C 3/067 |
| | | | 60/791 |
| 2007/0053779 A1 | 3/2007 | Guemmer | |
| 2008/0131272 A1 | 6/2008 | Wood et al. | |
| 2008/0149205 A1 | 6/2008 | Gupta et al. | |
| 2009/0123276 A1 | 5/2009 | Greim et al. | |
| 2011/0129346 A1 | 6/2011 | Jarrah et al. | |
| 2012/0237344 A1 | 9/2012 | Wood et al. | |
| 2013/0089415 A1 | 4/2013 | Brown et al. | |
| 2014/0133982 A1 | 5/2014 | Dejeu et al. | |
| 2014/0234095 A1 | 8/2014 | Auchoybur | |
| 2015/0284070 A1 | 10/2015 | Breeze-Stringfellow et al. | |
| 2016/0052621 A1 | 2/2016 | Ireland et al. | |
| 2016/0177723 A1 | 6/2016 | Lohaus et al. | |
| 2016/0195010 A1 | 7/2016 | Roberge | |
| 2018/0112547 A1 | 4/2018 | Snider et al. | |
| 2018/0363554 A1 | 12/2018 | Kroger et al. | |
| 2019/0048724 A1 | 2/2019 | Tweedt | |
| 2019/0063313 A1 | 2/2019 | Rez et al. | |
| 2019/0301286 A1 | 10/2019 | Spangler et al. | |
| 2020/0003157 A1* | 1/2020 | Clements | F01D 5/225 |
| 2021/0087940 A1 | 3/2021 | Clark et al. | |
| 2021/0189883 A1 | 6/2021 | Koda | |
| 2021/0270137 A1 | 9/2021 | Sozio et al. | |
| 2021/0310417 A1 | 10/2021 | Hrubec et al. | |

\* cited by examiner

COUNTER-ROTATING TURBINE

FIELD

The present subject matter relates generally to a counter-rotating turbine of a gas turbine engine. More specifically, the subject matter relates to a counter-rotating low pressure turbine of a gas turbine engine.

BACKGROUND

A gas turbine engine typically includes a fan and a turbomachine. The turbomachine generally includes an inlet, one or more compressors, a combustor, and one or more turbines. The compressors compress air channeled to the combustor where the compressed air is mixed with fuel. The mixture is then ignited for generating hot combustion gases. The combustion gases are channeled to the turbine(s) that extract energy from the combustion gases for powering the compressor(s), and for producing useful work to propel an aircraft in flight and/or to power a load, such as an electrical generator.

During operation of the gas turbine engine, a relatively large amount of heat energy is generated through the compression process by the compressors and through the combustion process within the combustor. While a substantial portion of the heat energy is extracted through the one or more turbines, a portion of such heat energy is exhausted to atmosphere. Such may lead to a loss of efficiency of the gas turbine engine. Accordingly, a system and/or a method for operating a gas turbine engine in a manner to increase an efficiency of the gas turbine engine, and to reduce an amount of waste heat exhausted to atmosphere, would be useful.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
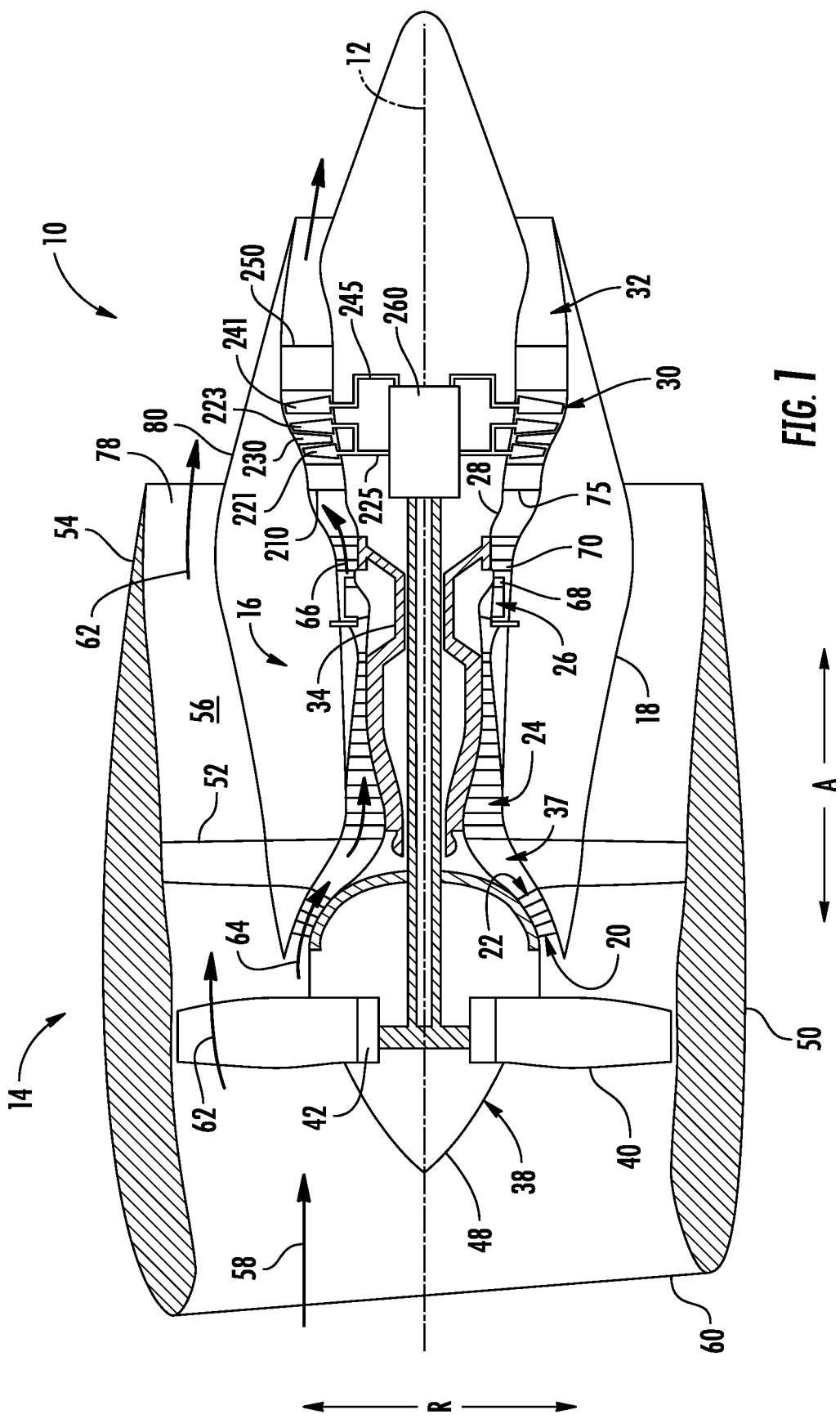
FIG. 1 is a schematic cross-sectional view of a gas turbine engine according to one or more embodiments.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, and is not intend to be limiting in any way. In fact, it will be apparent to those skilled in the art that various modifications and variations may be made in the present disclosure without departing from the scope or the spirit of the disclosure. For instance, features illustrated or described as part of one embodiment may be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc., each refers to relative speeds within an engine unless otherwise specified. For example, a "low turbine" or "low speed turbine" defines a component configured to operate at a rotational speed, such as a maximum allowable rotational speed, lower than a "high turbine" or a "high speed turbine" of the engine.

In a conventional gas turbine engine, a significant amount of heat is exhausted to atmosphere as waste heat. One way of reducing the amount of waste heat and improving an efficiency of the gas turbine engine is recovering some of the waste heat via a heat source exchanger positioned within an exhaust section of the gas turbine engine.

While conventional gas turbine engines have low pressure turbines that operate at comparatively low speeds to drive the low speed compressor and/or the fan, gas turbine engines may instead employ high speed low pressure turbines that rotate at a higher speed than the conventional low pressure turbines. The high speed low pressure turbines may include a reducing gearbox in the fan module such that the rotation speed of the fan is reduced from the high rotation speed of the high speed low pressure turbines.

However, due to the increased rotation speeds, the blades of the high speed low pressure turbines experience increased stresses compared to conventional low pressure turbines. Because an increase in size of the blades also increases an amount of stress experienced thereby, a material capability of the blades may require a size of the blades to be reduced to compensate for the increased stresses caused by the higher rotation speeds. Therefore, high speed low pressure turbines may have a limited exhaust annulus area due to blade material capability.

Additionally, the higher speeds of the blades within the high speed low pressure turbines may also result in a high exhaust Mach number. That is, the combustion gases exiting the high speed low pressure turbines and entering the exhaust section may have a high Mach number. The high Mach number entering the exhaust section may cause losses in waste heat recovery for heat source exchangers within the exhaust section. This loss is proportional to a square of the Mach number of the combustion gases entering the heat source exchangers.

A counter-rotating turbine according to one or more embodiments allows for larger turbine blades within high speed low pressure turbines and a more axially compact package, while reducing the exhaust Mach number and significantly reducing losses in waste heat recovery for the heat source exchangers within the exhaust section. According to one or more embodiments, by allowing for lower speed final stage low pressure turbine blades, the final stage low pressure turbine blades may be formed to have larger radial dimensions and thus larger annulus flow areas, which in turn reduces a Mach number of the flow entering the heat source exchanger downstream of the final stage low pressure turbine blades.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "gas turbine engine 10." As shown in FIG. 1, the gas turbine engine 10 defines an axial direction A (extending parallel to a longitudinal centerline 12 provided for reference), a radial direction R, and a circumferential direction (i.e., a direction extending about the axial direction A; not depicted). In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24, a combustion section 26, a turbine section including a high pressure (HP) turbine 28 and a low pressure (LP) turbine 30, and an exhaust section 32. The compressor section, the combustion section 26, and the turbine section together define a core air flowpath 37 extending from the annular inlet 20 through the LP compressor 22, the HP compressor 24, the combustion section 26, the HP turbine 28, the LP turbine 30 and the exhaust section 32. A high pressure (HP) shaft or a spool 34 drivingly connects the HP turbine 28 to the HP compressor 24. A low pressure (LP) shaft or a spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal centerline 12 by the LP shaft or the spool 36.

Referring still to the exemplary embodiment of FIG. 1, the disk 42 is covered by rotatable spinner cone 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. For the embodiment depicted, the outer nacelle 50 is supported relative to the turbomachine 16 by a plurality of circumferentially-spaced outlet guide vanes 52. Moreover, a downstream section 54 of the outer nacelle 50 extends over an outer portion of turbomachine 16 so as to define a bypass airflow passage 56 therebetween.

During operation of the gas turbine engine 10, a volume of air 58 enters the gas turbine engine 10 through an associated inlet 60 of the outer nacelle 50 and/or the fan section 14. As the volume of air 58 passes across the fan blades 40, a first portion of air 62 from the volume of air 58 is directed or routed into the bypass airflow passage 56 and a second portion of air 64 from the volume of air 58 is directed or routed into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24.

The combustion gases 66 are then routed through the LP turbine 30 where a second portion of thermal and kinetic energy is extracted from the combustion gases 66 via first stage LP turbine rotor blades 221 and second stage LP turbine rotor blades 223 that rotate together in a first direction around the longitudinal centerline 12, and final stage LP turbine rotor blades 241 that rotate in a second direction around the longitudinal centerline 12 opposite the first direction. First turbine guide vanes 210 are disposed upstream of the first stage LP turbine rotor blades 221, and second turbine guide vanes 230 are disposed between the first stage LP turbine rotor blades 221 and the second stage LP turbine rotor blades 223. The first stage LP turbine rotor blades 221 and the second stage LP turbine rotor blades 223 are connected via a first LP turbine spool 225 that rotates in the first direction around the longitudinal centerline 12 and is coupled to a gearbox 260. The final stage LP turbine rotor blades 241 are connected to a second LP turbine spool 245 that rotates in the second direction and is also coupled to the gearbox 260. The gearbox 260 is further coupled to the LP shaft or spool 36, such that the first stage LP turbine rotor blades 221, the second stage LP turbine rotor blades 223, and the final stage LP turbine rotor blades 241 drive the LP shaft or spool 36 to rotate through the gearbox 260. Thus, the LP turbine 30 supports operation of the LP compressor 22 and/or rotation of the fan 38.

The combustion gases 66 are subsequently routed through the exhaust section 32 of the turbomachine 16 to provide propulsive thrust. The exhaust section 32 includes a heat source exchanger 250 disposed immediately downstream of the final stage LP turbine rotor blades 241.

Simultaneously, the pressure of the first portion of air 62 is substantially increased as the first portion of air 62 is routed through the bypass airflow passage 56 before it is exhausted from a fan nozzle exhaust section 78 of the gas turbine engine 10, also providing propulsive thrust. The HP turbine 28, the LP turbine 30, and the exhaust section 32 at least partially define a hot gas path for routing the combustion gases 66 through the turbomachine 16.

The exemplary gas turbine engine 10 depicted in FIG. 1 is by way of example only, and in other exemplary embodiments, the gas turbine engine 10 may have any other suitable configuration. For example, in other exemplary embodiments, the gas turbine engine 10 may instead be configured as any other suitable turbomachine including, e.g., any other suitable number of shafts or spools, and excluding, e.g., the fan 38 and/or including, e.g., a gearbox between the fan 38 and the LP shaft or spool 36, a variable pitch fan 38, etc. Accordingly, in other exemplary embodiments, the gas turbine engine 10 may instead be configured as, e.g., a turbojet engine, a turboshaft engine, a turboprop engine, etc., and further may be configured as an aeroderivative gas turbine engine or an industrial gas turbine engine.

Figure 2:
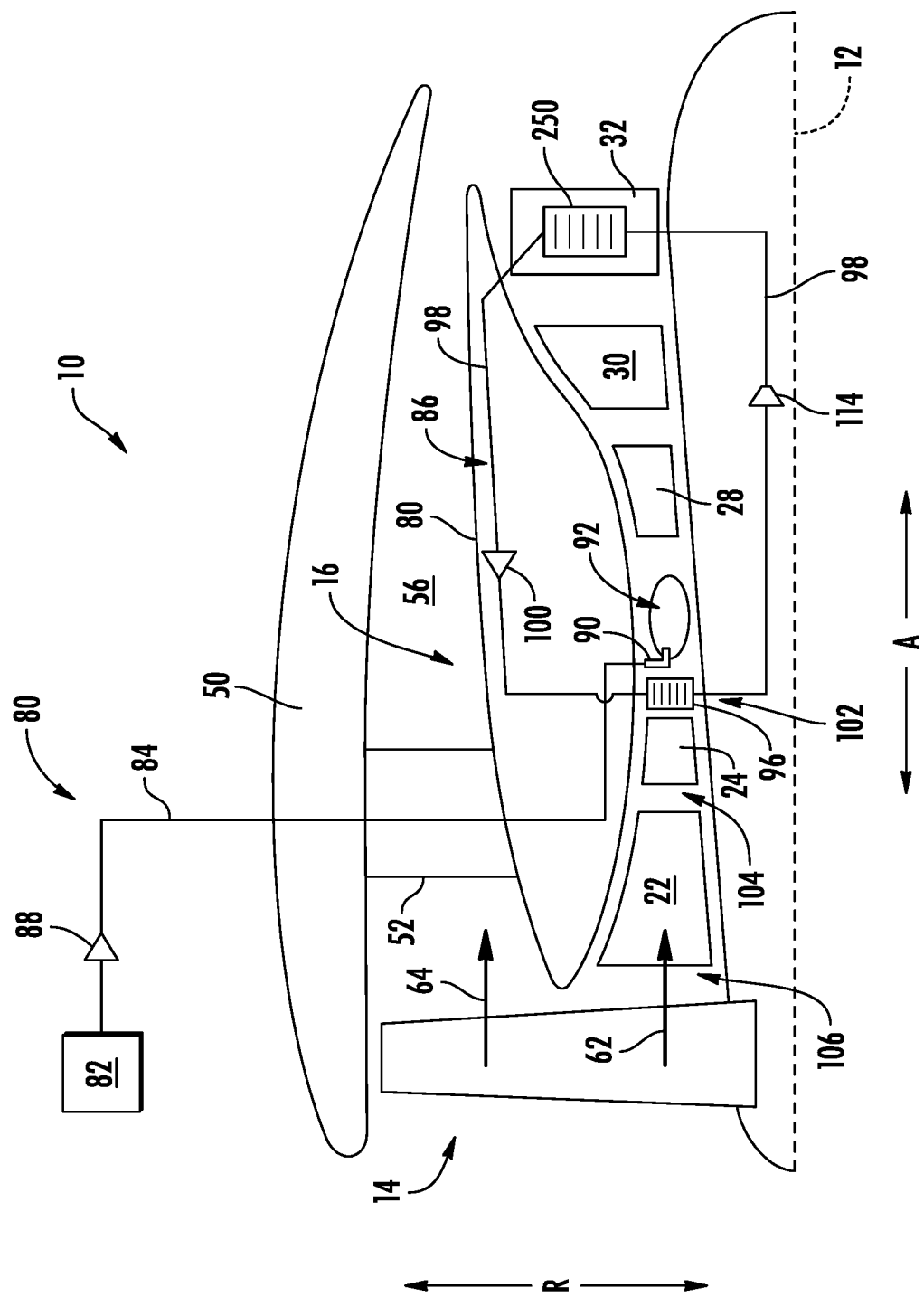
FIG. 2 is a simplified schematic view of a gas turbine engine and a waste heat recovery system in accordance with one or more embodiments.

Referring now to FIG. 2, a simplified, schematic view of a gas turbine engine 10 in accordance with an exemplary aspect of the present disclosure is provided. The exemplary gas turbine engine 10 depicted in FIG. 2 may be configured in substantially the same manner as exemplary gas turbine engine 10 described above with reference to FIG. 1.

For example, as is shown, the gas turbine engine 10 generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. The compressor section, the combustion section 26, the turbine section, and the exhaust section 32 generally define a core air flowpath 37 extending therethrough.

A fuel delivery system 80 is also included for providing a flow of fuel to the combustion section 26 of the gas turbine engine 10, and more specifically to a combustion chamber 92 of the combustion section 26. For example, the fuel delivery system 80 generally includes a plurality of fuel lines 84 and a fuel nozzle 90. The fuel nozzle 90 may receive a flow of fuel from the plurality of fuel lines 84 and further may receive compressed air from the compressor section (e.g., the HP compressor 24). The fuel nozzle 90 may accordingly provide a mixture of compressed air and fuel to the combustion chamber 92, wherein such mixture of compressed air and fuel is combusted to generate combustion gases. The fuel delivery system 80 generally also includes a fuel source 82 and a pump 88 in fluid communication with the one or more fuel lines 84, the pump 88 configured for increasing a pressure of a fuel flow from the fuel source 82 and through the one or more fuel lines 84.

Moreover, the turbomachine 16 and fan section 14 are at least partially surrounded by an outer nacelle 50, with the turbomachine 16 supported relative to the outer nacelle 50 through a plurality of outlet guide vanes 52. The outer nacelle 50 defines a bypass airflow passage 56 with the turbomachine 16. A first portion 62 of an airflow from the fan section 14 is provided through the turbomachine 16 as a core airflow, and a second portion of the air 64 from the fan section 14 is provided through the bypass airflow passage 56 as a bypass airflow.

In addition, the exemplary gas turbine engine 10 includes a waste heat recovery system 86. The exemplary waste heat recovery system 86 is generally configured to extract heat from a heat source (e.g., a heat source not fully utilizing the heat being extracted therefrom) and transfer such extracted heat to a heat sink, such that the heat sink may more efficiently utilize such extracted heat.

Referring particularly to the exemplary waste heat recovery system 86 depicted in FIG. 2, the waste heat recovery system 86 generally includes a heat source exchanger 250 (i.e., a heat exchanger configured to extract heat for the waste heat recovery system 86 from a heat source of the gas turbine engine 10), a heat sink exchanger 96 (i.e., a heat exchanger configured to transfer heat from the waste heat recovery system 86 to a heat sink of the gas turbine engine 10), a thermal transfer bus 98, and a pump 100. Each of these components is described in greater detail as follows.

For the embodiment shown, the heat source exchanger 250 is in thermal communication with the exhaust section 32 of the gas turbine engine 10 such that the heat source exchanger 250 extracts heat from the exhaust section 32. The heat source exchanger 250 may be integrated into a strut extending through the exhaust section 32 or a liner defining at least in part the exhaust section 32, or alternatively may be positioned at any other suitable location in thermal communication with an airflow/gases through the exhaust section 32 of the gas turbine engine 10.

Moreover, for the exemplary embodiment depicted, the heat sink exchanger 96 is in thermal communication with the heat sink, which may generally be the compressor section, the fuel delivery system 80, and/or any other section of the aircraft requiring heat. For example, for the embodiment depicted in FIG. 2, the heat sink exchanger 96 is in thermal communication with the compressor section at a location proximate a downstream end of the compressor section, or more specifically still with a location proximate a downstream end of the HP compressor 24 of the compressor section. As used herein, the term "proximate the downstream end," with reference to the compressor section refers to a location closer to an exit of the compressor section than an inlet to the compressor section and upstream of the combustion chamber 92. Similarly, as used herein, the term "proximate the downstream end," with reference to the HP compressor 24 refers to a location closer to an exit 102 of the HP compressor 24 than an inlet 104 to the HP compressor 24 and upstream of the combustion chamber 92. For example, in certain embodiments, the heat sink exchanger 96 may be integrated into, or coupled to, a strut or guide vane, such as a diffuser, positioned at the exit 102 of the HP compressor 24 and upstream of the combustion chamber 92 of the combustion section 26. Additionally, or alternatively, the heat sink exchanger 96 may be integrated into, or coupled to, one or more fuel nozzles 90 of the fuel delivery system 80.

According to one or more embodiments, the heat sink exchanger 96 is disposed in a portion of the gas turbine engine 10 upstream of the combustion section 26. The heat sink exchanger 96 may be disposed within the fuel delivery system 80 upstream of the combustion section 26, within the core air flowpath 37 upstream of the combustion section 26, or other locations upstream of the combustion section 26. Here, the term "upstream" refers to the direction of flow and not the axial direction. As such, the heat sink exchanger 96 may be forward of, aft of, or in line with the combustion section 26 in the axial direction A. The fuel delivery system 80 may deliver conventional fuel or, alternatively or additionally, may deliver $H_2$ fuel.

For the embodiment shown, the heat sink exchanger 96 is in thermal communication with the exit 102 of the HP compressor 24 of the gas turbine engine 10. The "compressor exit" refers to an outlet of the HP compressor 24. In such a manner, the heat sink exchanger 96 may add heat to an airflow through the core air flowpath 37 prior to such airflow entering the combustion chamber 92, resulting in a more efficient gas turbine engine 10.

Further, the waste heat recovery system 86 includes the thermal transfer bus 98. The thermal transfer bus 98 includes a thermal transfer fluid and extends from the heat source exchanger 250 to the heat sink exchanger 96. In such a manner, the thermal bus is configured to transfer the thermal transfer fluid from the heat source exchanger 250 (wherein the thermal transfer fluid has accepted heat from the airflow through, for the embodiment shown, the exhaust section 32 of the gas turbine engine 10) to the heat sink exchanger 96 (wherein the thermal transfer fluid transfers heat to the airflow through, for the embodiment shown, the exit 102 of the HP compressor 24, or other location upstream of the combustion chamber 92). The thermal transfer bus 98 may include one or more pipes, conduits, etc. arranged in series, parallel, or some combination thereof.

In one or more embodiments, the gas turbine engine 10 may define a relatively high overall pressure ratio. As used herein, the term overall pressure ratio refers to a ratio of a pressure of the air through the turbomachine 16 at an outlet of the compressor section (i.e., the exit 102 of the HP compressor 24 for the embodiment shown) to a pressure of the air through the turbomachine 16 at an inlet of the compressor section (i.e., an inlet 106 of the LP compressor 22 for the embodiment shown). In at least certain exemplary embodiments, the overall pressure ratio of the gas turbine engine 10 depicted in FIG. 2 may be at least about twenty-five. For example, in certain exemplary embodiments, the overall pressure ratio of the gas turbine engine 10 depicted in FIG. 2 may be at least about twenty-eight, such as at least about thirty, such as at least about thirty-two, such as up to about seventy-five.

In order to allow or facilitate the waste heat recovery system 86 to transfer heat from the heat source exchanger 250 to the heat sink exchanger 96, the exemplary waste heat recovery system 86 may further include the pump 100 in fluid communication with the thermal transfer bus 98 downstream of the heat source exchanger 250 and upstream of the heat sink exchanger 96 for increasing a temperature and a pressure of the thermal transfer fluid in the thermal transfer bus 98. For example, in certain exemplary embodiments, the pump 100 may be configured to provide at least about a twenty-five pounds per square inch ("psi") pressurize rise, such as at least about a fifty psi of pressurize rise, such as at least about a one hundred psi of pressurize rise, such as up to about five thousand psi pressure rise, in the thermal transfer fluid through the thermal transfer bus 98, and similarly may be configured to provide at least about one hundred fifty (150) degrees Celsius temperature rise, such as at least about two hundred fifty (250) degrees Celsius temperature rise, and up to about one thousand (1,000) degrees Celsius temperature rise, in the thermal transfer fluid through the thermal transfer bus 98. The pump 100 may be powered through, e.g., one or more of the shafts or spools of the gas turbine engine 10, or alternatively may be powered by an electric motor, hydraulic motor, pneumatic motor, or any other suitable power source. In other exemplary embodiments, however, the pump 100 may have any other suitable configuration. For example, in other embodiments, the pump 100 may be configured to create any other suitable temperature and/or pressure rise, or some other suitable device or configuration may be provided to increase a temperature and/or pressure of the thermal fluid through the thermal transfer bus 98 and provide for the flow of thermal fluid through the thermal transfer bus 98.

Referring still to FIG. 2, it will be appreciated that the exemplary thermal transfer bus 98 is a closed loop thermal transfer bus 98 further extending from the heat sink exchanger 96 back to the heat source exchanger 250. Further, for the embodiment shown, the exemplary waste heat recovery system 86 further includes an expansion device in fluid communication with the thermal transfer bus 98 downstream of the heat sink exchanger 96 and upstream of the heat source exchanger 250. The expansion device may be any suitable expansion device. For example, for the embodiment shown, the expansion device is configured as a turbine 114 in fluid communication with the thermal transfer bus 98 downstream of the heat sink exchanger 96 and upstream of the heat source exchanger 250. With such an embodiment, the turbine 114 may extract additional energy from the thermal transfer fluid, increasing an efficiency of the waste heat recovery system 86 and the gas turbine engine 10. As will be appreciated, inclusion of the expansion device may generally allow for the reduction of a temperature of the thermal transfer fluid to a relatively low temperature such that the thermal transfer fluid may accept heat from the heat source through the heat source exchanger 250. For example, the expansion device may reduce a temperature of the thermal transfer fluid at least about one hundred degrees Celsius, such as at least about one hundred and fifty degrees Celsius, such as up to about one thousand degrees Celsius.

However, in other embodiments, the expansion device may not be configured to extract additional work form the thermal transfer fluid, and instead may simply be configured to expand the thermal transfer fluid (e.g., through an increasing cross-sectional area) to reduce a temperature and a pressure of the thermal transfer fluid. Further, although the expansion device/turbine 114 is depicted schematically inward of the core air flowpath 37 along a radial direction R of the gas turbine engine 10 of FIG. 2, in other embodiments, the expansion device/turbine 114 may instead be positioned outward of the core air flowpath 37 along the radial direction R.

In one or more embodiments, the thermal transfer fluid may be a single phase thermal transfer fluid during operation of the waste heat recovery system 86. In such a manner, the thermal transfer fluid may remain in substantially a liquid phase during operation. Alternatively, the thermal transfer fluid may be a phase change thermal transfer fluid during operation of the waste heat recovery system 86. For example, the waste heat recovery system 86 may generally operate on a refrigeration cycle, such that the thermal transfer fluid changes between liquid and gaseous phases during operation of the waste heat recovery system 86. Additionally, or alternatively still, in one or more these configurations, the thermal transfer fluid may be in a supercritical phase during one or more stages of operation, or during all operations. For example, the thermal transfer fluid may be a supercritical carbon dioxide during certain operations or all operations of the waste heat recovery system 86.

The exemplary gas turbine engine 10 and waste heat recovery system 86 depicted in FIG. 2 is, however, provided by way of example only. In other embodiments, the waste heat recovery system 86 may have any other suitable configuration. As noted above, the heat sink exchanger 96 may be disposed in any other location that may use the heat from the waste heat recovery system 86 to improve, e.g., efficiency.

Figure 3:
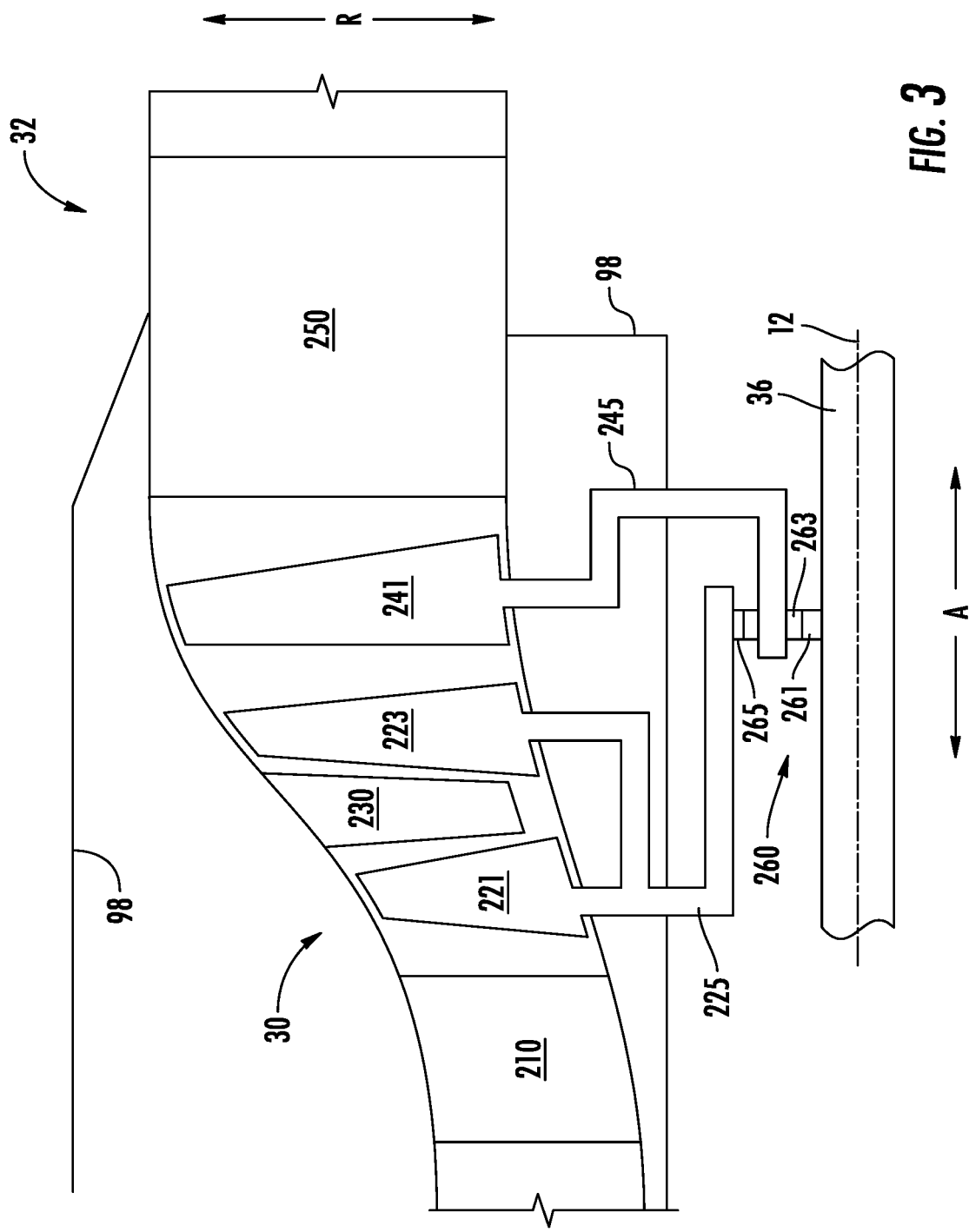
FIG. 3 is a schematic view of a portion of a turbine section and an exhaust section of a gas turbine engine according to one or more embodiments.

FIG. 3 is a schematic view of a portion of a turbine section and an exhaust section 32 of a gas turbine engine according to one or more embodiments. More specifically, FIG. 3 shows an LP turbine 30 and a heat source exchanger 250 disposed within the exhaust section 32 according to one or more embodiments. In certain exemplary embodiments, the turbine section and exhaust section 32 of FIG. 3 may be configured in a similar manner as the exemplary turbine section and exhaust section 32 described above with reference to FIG. 1. For example, the turbine section is generally configured as part of a gas turbine engine defining a radial direction R and an axial direction A.

The LP turbine 30 according to one or more embodiments includes, in serial flow order and along the axial direction A, first turbine guide vanes 210, first stage LP turbine rotor blades 221, second turbine guide vanes 230, second stage LP turbine rotor blades 223, and final stage LP turbine rotor blades 241. The exhaust section 32 according to one or more embodiments is disposed downstream of the LP turbine 30 in the axial direction A and includes the heat source exchanger 250 also downstream of the final stage LP turbine rotor blades 241 in the axial direction A.

The gas turbine engine further includes a waste heat recovery system 86 with a thermal transfer bus 98 having a thermal transfer fluid configured to flow therethrough. The heat source exchanger 250 is part of the waste heat recovery system 86 and is coupled to the thermal transfer bus 98, such that the thermal transfer fluid passing through the thermal transfer bus 98 passes through the heat source exchanger 250 to extract heat from the exhaust section 32 of the gas turbine engine 10.

According to one or more embodiments, the heat source exchanger 250 is a frame-integrated heat exchanger that is integrated into the frame of the turbomachine 16. According to one or more embodiments, the heat source exchanger 250 is a heat exchanger formed separately from the frame of the turbomachine 16.

According to one or more embodiments, the first turbine guide vanes 210 are directly upstream of the first stage LP turbine rotor blades 221, the first stage LP turbine rotor blades 221 are directly upstream of the second turbine guide vanes 230, the second turbine guide vanes 230 are directly upstream of the second stage LP turbine rotor blades 223, and the second stage LP turbine rotor blades 223 are directly upstream of the final stage LP turbine rotor blades 241, and the final stage LP turbine rotor blades 241 are directly upstream of the heat source exchanger 250. According to one or more embodiments, the first turbine guide vanes 210 and the second turbine guide vanes 230 are stationary.

While FIGS. 1 and 3 show two stages of turbine rotor blades with a single stage of turbine guide vanes therebetween upstream of the final stage LP turbine rotor blades 241, one or more embodiments may include additional stages of turbine rotor blades and turbine guide vanes. For example, the LP turbine 30 may further include third turbine guide vanes and third stage LP turbine rotor blades in serial order downstream of the second stage LP turbine rotor blades 223 and may further include fourth turbine guide vanes and fourth stage LP turbine rotor blades in serial order downstream of the third stage LP turbine rotor blades, and so on.

The first stage LP turbine rotor blades 221 and the second stage LP turbine rotor blades 223 rotate in a first direction around the longitudinal centerline 12. The first stage LP turbine rotor blades 221 and the second stage LP turbine rotor blades 223 are connected to each other via a first LP turbine spool 225 that is driven by the first stage LP turbine rotor blades 221 and the second stage LP turbine rotor blades 223 to rotate in the first direction around the longitudinal centerline 12. The first LP turbine spool 225 is coupled to a gearbox 260. If more than two stages of LP turbine rotor blades are disposed upstream of the final stage LP turbine rotor blades 241, the additional stage(s) of LP turbine rotor blades are also connected to the first stage LP turbine rotor blades 221 and the second stage LP turbine rotor blades 223 via the first LP turbine spool 225.

The final stage LP turbine rotor blades 241 are connected to a second LP turbine spool 245 and rotate in a second direction around the longitudinal centerline 12, which is opposite the first direction. The final stage LP turbine rotor blades 241 are connected to the second LP turbine spool 245 that is driven by the final stage LP turbine rotor blades 241 to rotate in the second direction. The second LP turbine spool 245 is also coupled to the gearbox 260.

The gearbox 260 is further coupled to the LP shaft or spool 36, such that the first stage LP turbine rotor blades 221, the second stage LP turbine rotor blades 223, and the final stage LP turbine rotor blades 241 drive the LP shaft or spool 36 through the gearbox 260. Thus, the LP turbine 30 supports operation of the LP compressor 22 and/or rotation of the fan 38 (see FIG. 1). According to one or more embodiments, the gearbox 260 is disposed partially or entirely on an inner side of the LP turbine 30 in the radial direction R.

According to one or more embodiments, the gearbox 260 may be structured as a planetary gear system in which that the LP shaft or spool 36 is fixed to or connected to a sun gear 261, the second LP turbine spool 245 is connected to planet gears 263 that are disposed around the sun gear 261 and are meshed with the sun gear 261, and the first LP turbine spool 225 is fixed to or connected to a ring gear 265 disposed around the planet gears 263 and is meshed with the planet gears 263. Thus, the first LP turbine spool 225 and the LP shaft or spool 36 rotate in the first direction around the longitudinal centerline 12, with the first LP turbine spool 225 rotating at a higher speed than the LP shaft or spool 36, and the second LP turbine spool 245 rotates in the second direction at a lower speed than the first LP turbine spool 225.

As shown in FIG. 3, the final stage LP turbine rotor blades 241 have a significantly greater height in the radial direction R than the first stage LP turbine rotor blades 221 and the second stage LP turbine rotor blades 223. The final stage LP turbine rotor blades 241 also have a significantly greater height in the radial direction R than final stage LP turbine rotor blades of conventional high speed low pressure turbines that rotate at the same speed in the same direction as the preceding stages of LP turbine rotor blades. This greater height is possible due to the reduced speed of the final stage LP turbine rotor blades 241 rotating in the second direction, as the reduced speed reduces the stresses experienced by the final stage LP turbine rotor blades 241 compared to the aforementioned final stage LP turbine rotor blades of conventional high speed low pressure turbines. Furthermore, the reduction in stresses experienced by the final stage LP turbine rotor blades 241 may also enable materials that could not withstand the greater stresses experienced by the final stage LP turbine rotor blades of conventional high speed low pressure turbines. According to one or more embodiments, the first stage LP turbine rotor blades 221, the second stage LP turbine rotor blades 223, and the final stage LP turbine rotor blades 241 are formed of nickel alloys, or are formed of a material that comprises nickel alloys. According to one or more embodiments, the final stage LP turbine rotor blades 241 are formed of a different material from the first stage LP turbine rotor blades 221 and the second stage LP turbine rotor blades 223. According to one or more embodiments, the final stage LP turbine rotor blades 241 are formed of titanium aluminide or a material comprising titanium aluminide. As titanium aluminide is lighter than nickel alloys, forming the final stage LP turbine rotor blades 241 of titanium aluminide instead of nickel alloys, enabled by the lower speed of the final stage LP turbine rotor blades 241, results in significant weight savings that in turn enables a more efficient gas turbine engine 10.

According to one or more embodiments, the lower speed of rotation of the final stage LP turbine rotor blades 241 also reduces a Mach number of the combustion gases exiting the LP turbine 30 and entering the exhaust section 32. For example, combustion gases may exit conventional high speed low pressure turbines and enter the exhaust section at a Mach number equal to around ½ Ma. According to one or more embodiments, the LP turbine 30 is structured such that combustion gases exit the LP turbine 30 and enter the exhaust section 32 at a Mach number of ⅓ Ma or lower. With a Mach number of ⅓ Ma or less, a frame-integrated heat exchanger that is integrated into the frame of the turbomachine 16 may be employed as the heat source exchanger 250 in the exhaust section 32. According to one or more embodiments, the LP turbine 30 is structured such that combustion gases exits the LP turbine 30 and enters the exhaust section 32 at a Mach number of ¼ Ma or less. With a Mach number of a ¼ Ma or lower, a traditional heat exchanger separate from the frame of the turbomachine 16 may be employed as the heat source exchanger 250 in the exhaust section 32.

Additionally, due to the counter-rotation between the final stage LP turbine rotor blades 241 and the stage of the LP turbine rotor blades immediately upstream of the final stage LP turbine rotor blades 241, no guide vane is required therebetween. Thus, compared to a conventional high speed LP turbine in which the final stage LP turbine rotor blades rotate in the same direction as the other stages of LP turbine rotor blades, a guide vane can be removed, such that a more axially compact LP turbine 30 may be formed. Additionally, the more axially compact LP turbine 30 may in turn create more space in the axial direction A for the heat source exchanger 250. A larger heat source exchanger 250 extracts more heat from the exhaust section 32.

This written description uses examples, including the best mode, and also to enable any person skilled in the art to practice the disclosure, including making and using any devices or systems and performing any incorporated methods. The patentable scope is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects are provided by the subject matter of the following clauses:

A turbine section and an exhaust section for a gas turbine engine comprises a low pressure (LP) turbine comprising first stage LP turbine blades that rotate in a first direction at a first speed, and final stage LP turbine blades downstream of the first stage LP turbine blades that rotate in a second direction opposite the first direction at a second speed, wherein the second speed is lower than the first speed.

The turbine section and the exhaust section of one or more of these clauses, wherein the LP turbine further comprises second stage LP turbine blades downstream of the first stage LP turbine blades and upstream of the final stage LP turbine blades that rotate in the first direction at the first speed, and guide vanes disposed between the first stage LP turbine blades and the second stage LP turbine blades.

The turbine section and the exhaust section of one or more of these clauses, further comprising a heat source exchanger disposed downstream of the final stage LP turbine blades.

The turbine section and the exhaust section of one or more of these clauses, wherein the first stage LP turbine blades are connected to a first LP turbine spool, wherein the final stage LP turbine blades are connected to a second LP turbine spool, and wherein the LP turbine further comprises a gearbox to which the first LP turbine spool and the second LP turbine spool are coupled.

The turbine section and the exhaust section of one or more of these clauses, wherein the gearbox comprises a planetary gear system, wherein a ring gear of the planetary gear system is connected to the first LP turbine spool, wherein planet gears of the planetary gear system are connected to the second LP turbine spool, and wherein a sun gear of the planetary gear system is configured to be connected to an LP shaft or a spool that is connected to a fan of the gas turbine engine.

The turbine section and the exhaust section of one or more of these clauses, wherein the last stage LP turbine blades are formed of a different material from the first stage LP turbine blades.

The turbine section and the exhaust section of one or more of these clauses, wherein the final stage LP turbine blades are the only turbine rotor blades of the LP turbine configured to rotate in the second direction.

The turbine section and the exhaust section of one or more of these clauses, further comprising a high pressure (HP) turbine located upstream of the LP turbine.

A turbine section and an exhaust section of a gas turbine engine comprises a low pressure (LP) turbine comprising a plurality of stages of LP turbine blades that rotate in a first direction at a first speed, and final stage LP turbine blades downstream of the plurality of stages of LP turbine blades that rotate in a second direction opposite the first direction at a second speed, wherein the second speed is lower than the first speed.

The turbine section and the exhaust section of one or more of these clauses, wherein the LP turbine further comprises a drum positioned inward of an airflow path through the LP turbine along a radial direction of the gas turbine engine, wherein the plurality of stages of LP turbine blades that rotate in the first direction are coupled together with the drum, wherein each of the final stages LP turbine blades includes an outer end along the radial direction, and wherein each of the final stages LP turbine blades is mechanically isolated at the outer end.

The turbine section and the exhaust section of one or more of these clauses, wherein the LP turbine further comprises guide vanes disposed between adjacent stages of the plurality of stages of LP turbine blades.

The turbine section and the exhaust section of one or more of these clauses, wherein the final stage LP turbine blades are disposed directly downstream of a furthest downstream stage of LP turbine blades of the plurality of stages of LP turbine blades.

The turbine section and the exhaust section of one or more of these clauses, further comprising a heat source exchanger disposed downstream of the final stage LP turbine blades.

The turbine section and the exhaust section of one or more of these clauses, wherein each of the plurality of stages of LP turbine blades is connected to a first LP turbine spool, wherein the final stage LP turbine blades are connected to a second LP turbine spool, and wherein the LP turbine further comprises a gearbox to which the first LP turbine spool and the second LP turbine spool are coupled.

The turbine section and the exhaust section of one or more of these clauses, wherein the gearbox comprises a planetary gear system, wherein a ring gear of the planetary gear system is connected to the first LP turbine spool, wherein planet gears of the planetary gear system are connected to the second LP turbine spool, and wherein a sun gear of the planetary gear system is configured to be connected to a LP shaft or spool that is connected to a fan of the gas turbine engine.

A gas turbine engine comprises a low pressure (LP) turbine comprising a plurality of stages of LP turbine blades that rotate in a first direction at a first speed, and final stage LP turbine blades downstream of the plurality of stages of LP turbine blades that rotate in a second direction opposite the first direction at a second speed, wherein the second speed is lower than the first speed.

The gas turbine engine of one or more of these clauses, wherein each of the plurality of stages of LP turbine blades is connected to a first LP turbine spool, wherein the final stage LP turbine blades are connected to a second LP turbine spool, and wherein the LP turbine further comprises a gearbox to which the first LP turbine spool and the second LP turbine spool are coupled.

The gas turbine engine of one or more of these clauses, wherein the gearbox comprises a planetary gear system, wherein a ring gear of the planetary gear system is connected to the first LP turbine spool, wherein planet gears of the planetary gear system are connected to the second LP turbine spool, and wherein a sun gear of the planetary gear system is connected to an LP shaft or a spool that is connected to a fan of the gas turbine engine.

The gas turbine engine of one or more of these clauses, wherein the LP turbine is structured such that, during operation of the gas turbine engine, combustion gases exiting the LP turbine do not exceed a Mach number of ⅓ Ma.

The gas turbine engine of one or more of these clauses, further comprising a heat recovery system, wherein the heat recovery system comprises a heat source exchanger disposed downstream of the final stage LP turbine blades, and a heat sink exchanger disposed in a portion of the gas turbine engine upstream of a combustion section of the gas turbine engine.

What is claimed is:

1. A turbine section and an exhaust section for a gas turbine engine defining a longitudinal centerline, the turbine section and the exhaust section comprising:
   a low pressure (LP) turbine comprising:
   first stage LP turbine blades extending radially outward from the longitudinal centerline that rotate in a first direction at a first speed,
   a drum positioned inward of an airflow path through the LP turbine along a radial direction of the gas turbine engine, the first stage LP turbine blades coupled together with the drum; and
   final stage LP turbine blades extending radially outward from the longitudinal centerline downstream of the first stage LP turbine blades that rotate in a second direction opposite the first direction at a second speed, the final stage LP turbine blades including a mechanically isolated outer end along the radial direction,
   wherein the final stage LP turbine blades have a greater height in the radial direction than the first stage LP turbine blades.

2. The turbine section and the exhaust section of claim 1, wherein the LP turbine further comprises:
   second stage LP turbine blades downstream of the first stage LP turbine blades and upstream of the final stage LP turbine blades that rotate in the first direction at the first speed, the second stage LP turbine blades coupled together with the drum, and
   guide vanes disposed between the first stage LP turbine blades and the second stage LP turbine blades.

3. The turbine section and the exhaust section of claim 1, further comprising:
   a heat source exchanger disposed downstream of the final stage LP turbine blades.

4. The turbine section and the exhaust section of claim 1, wherein the first stage LP turbine blades are connected to a first LP turbine spool and extend outwardly from the first LP turbine spool along the radial direction,
   wherein the final stage LP turbine blades are connected to a second LP turbine spool and extend outwardly from the second LP turbine spool along the radial direction, and
   wherein the LP turbine further comprises a gearbox to which the first LP turbine spool and the second LP turbine spool are coupled.

5. The turbine section and the exhaust section of claim 4, wherein the gearbox comprises a planetary gear system,
   wherein a ring gear of the planetary gear system is connected to the first LP turbine spool,
   wherein planet gears of the planetary gear system are connected to the second LP turbine spool, and
   wherein a sun gear of the planetary gear system is configured to be connected to an LP shaft or a spool that is connected to a fan of the gas turbine engine.

6. The turbine section and the exhaust section of claim 1, wherein the last stage LP turbine blades are formed of a different material from the first stage LP turbine blades.

7. The turbine section and the exhaust section of claim 1, wherein the final stage LP turbine blades are the only turbine rotor blades of the LP turbine configured to rotate in the second direction.

8. The turbine section and the exhaust section of claim 1, further comprising:
   a high pressure turbine located upstream of the low pressure turbine.

9. A turbine section and an exhaust section of a gas turbine engine defining a longitudinal centerline, the turbine section and the exhaust section comprising:

a low pressure (LP) turbine comprising:
 a plurality of stages of LP turbine blades extending radially outward from the longitudinal centerline that rotate in a first direction at a first speed,
 a drum positioned inward of an airflow path through the LP turbine along a radial direction of the gas turbine engine, the plurality of stages of LP turbine blades that rotate in the first direction coupled together with the drum; and
 final stage LP turbine blades extending radially outward from the longitudinal centerline downstream of the plurality of stages of LP turbine blades that rotate in a second direction opposite the first direction at a second speed, the final stage LP turbine blades including a mechanically isolated outer end along the radial direction,
 wherein the final stage LP turbine blades have a greater height in the radial direction than the first stage LP turbine blades.

10. The turbine section and the exhaust section of claim 9, wherein the LP turbine further comprises guide vanes disposed between adjacent stages of the plurality of stages of LP turbine blades.

11. The turbine section and the exhaust section of claim 9, wherein the final stage LP turbine blades are disposed directly downstream of a furthest downstream stage of LP turbine blades of the plurality of stages of LP turbine blades.

12. The turbine section and the exhaust section of claim 9, further comprising:
 a heat source exchanger disposed downstream of the final stage LP turbine blades.

13. The turbine section and the exhaust section of claim 9,
 wherein each of the plurality of stages of LP turbine blades is connected to a first LP turbine spool and extend outwardly from the first LP turbine spool along the radial direction,
 wherein the final stage LP turbine blades are connected to a second LP turbine spool and extend outwardly from the second LP turbine spool along the radial direction, and
 wherein the LP turbine further comprises a gearbox to which the first LP turbine spool and the second LP turbine spool are coupled.

14. The turbine section and the exhaust section of claim 13,
 wherein the gearbox comprises a planetary gear system,
 wherein a ring gear of the planetary gear system is connected to the first LP turbine spool,
 wherein planet gears of the planetary gear system are connected to the second LP turbine spool, and
 wherein a sun gear of the planetary gear system is configured to be connected to an LP shaft or a spool that is connected to a fan of the gas turbine engine.

15. A gas turbine engine defining a longitudinal centerline, comprising:
 a low pressure (LP) turbine comprising:
 a plurality of stages of LP turbine blades extending radially outward from the longitudinal centerline that rotate in a first direction at a first speed,
 a drum positioned inward of an airflow path through the LP turbine along a radial direction of the gas turbine engine, the plurality of stages of LP turbine blades that rotate in the first direction coupled together with the drum; and
 final stage LP turbine blades extending radially outward from the longitudinal centerline downstream of the plurality of stages of LP turbine blades that rotate in a second direction opposite the first direction at a second speed, the final stage LP turbine blades including a mechanically isolated outer end along the radial direction,
 wherein the final stage LP turbine blades have a greater height in the radial direction than the first stage LP turbine blades.

16. The gas turbine engine according to claim 15,
 wherein each of the plurality of stages of LP turbine blades is connected to a first LP turbine spool and extend outwardly from the first LP turbine spool along the radial direction,
 wherein the final stage LP turbine blades are connected to a second LP turbine spool and extend outwardly from the second LP turbine spool along the radial direction, and
 wherein the LP turbine further comprises a gearbox to which the first LP turbine spool and the second LP turbine spool are coupled.

17. The gas turbine engine according to claim 16,
 wherein the gearbox comprises a planetary gear system,
 wherein a ring gear of the planetary gear system is connected to the first LP turbine spool,
 wherein planet gears of the planetary gear system are connected to the second LP turbine spool, and
 wherein a sun gear of the planetary gear system is connected to an LP shaft or a spool that is connected to a fan of the gas turbine engine.

18. The gas turbine engine according to claim 15,
 wherein the LP turbine is structured such that, during operation of the gas turbine engine, combustion gases exiting the LP turbine do not exceed a Mach number of ⅓ Ma.

19. The gas turbine engine according to claim 15, further comprising:
 a heat recovery system,
 wherein the heat recovery system comprises:
 a heat source exchanger disposed downstream of the final stage LP turbine blades, and
 a heat sink exchanger disposed in a portion of the gas turbine engine upstream of a combustion section of the gas turbine engine.

\* \* \* \* \*